United States Patent [19]
Fernbach

[11] Patent Number: 4,691,468
[45] Date of Patent: Sep. 8, 1987

[54] FISHING WEIGHT ASSEMBLY

[76] Inventor: James L. Fernbach, 2660 Wenning Rd., Cincinnati, Ohio 45231

[21] Appl. No.: 869,338

[22] Filed: Jun. 2, 1986

Related U.S. Application Data

[63] Continuation-in-part of Ser. No. 828,853, Feb. 12, 1986.

[51] Int. Cl.[4] ............................................. A01K 95/00
[52] U.S. Cl. .................................................. 43/44.9
[58] Field of Search .................... 43/44.87, 44.9, 44.92

[56] References Cited

U.S. PATENT DOCUMENTS

| | | | |
|---|---|---|---|
| 2,315,048 | 3/1943 | Croft | 43/44.9 |
| 3,096,599 | 7/1963 | Barron | 43/44.9 |
| 3,273,278 | 9/1966 | Lynch | 43/44.9 |
| 3,803,749 | 4/1974 | Boyum | 43/44.9 |
| 4,598,493 | 7/1986 | Obrien et al. | 43/44.9 |

FOREIGN PATENT DOCUMENTS 506097 10/1951 Belgium ............................... 43/44.9

Primary Examiner—Gene P. Crosby
Attorney, Agent, or Firm—James W. Pearce; Roy F. Schaeperklaus

[57] ABSTRACT

A fishing weight assembly. The assembly includes an elongated body having spaced end panels and an elongated bore. A radial slot in the body extends outwardly from the bore through an outer face of the body. The weight assembly also includes a plug member which includes a stem frictionally receivable in the bore and heads for bearing on the end panels. An elongated bore in the plug member extends lengthwise of the stem and the heads thereof. A radial slot extends from the bore of the plug member through an outer edge thereof. The slot of the plug member is alignable with the radial slot of the body so that a line can be inserted through the slots. The line can be locked in the bores of the body and the plug member when the plug member is rotated from aligned position.

2 Claims, 7 Drawing Figures

FISHING WEIGHT ASSEMBLY

BACKGROUND OF THE INVENTION

This is a continuation-in-part of my co-pending application Ser. No. 06/828,853 filed Feb. 12, 1986.

This invention relates to fishing weights. More particularly, this invention relates to a fishing weight through which a line extends so that the fishing weight is slideably mounted on the line.

An object of this invention is to provide a fishing weight which can be slideably mounted on a line without the need for dismantling objects mounted on the line. A fishing bobber which is slideably mounted on a fishing line is shown and claimed in my aforementioned co-pending application Ser. No. 06/828,853 filed Feb. 12, 1986.

BRIEF DESCRIPTION OF THE INVENTION

Briefly, this invention provides a fishing weight assembly which includes a weight body having a lengthwise bore in which a line can be mounted. A lengthwise radial slot in the weight body communicates with the bore and extends through an outer face of the weight body and permits the line to be mounted in the lengthwise bore. A plug is frictionally mounted in the lengthwise bore. The plug is provided with a generally radial slot alignable with the radial slot in the weight body. The slot of the plug extends diametrically beyond the center of the plug to provide a central lengthwise open portion inside the plug for receiving the line. When the generally radial slot in the plug is aligned with the radial slot of the weight body, the line can be inserted radially into the lengthwise bore of the weight body and into the central bore of the plug. The plug can be turned to move the generally radial slot of the plug out of alignment with the radial slot of the weight body, and the line can slide inside the weight body and the plug but is held in assembled relation with the body and plug.

The above and other objects and features of the invention will be apparent to those skilled in the art to which this invention relates from the following detailed description and the drawings, in which:

BRIEF DESCRIPTION OF THE DRAWINGS

In the following detailed description and the drawing, like reference characters indicate like parts.

DESCRIPTION OF PRESENTLY PREFERRED EMBODIMENT

Figure 1:
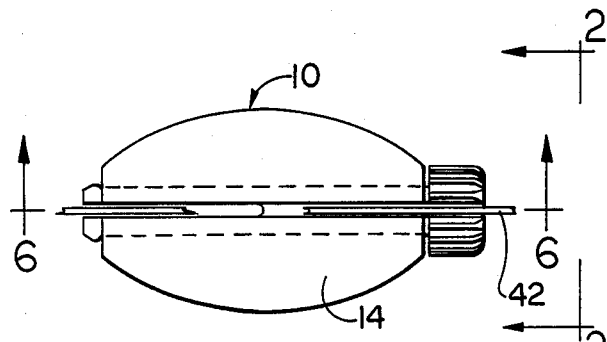
FIG. 1 is a view in side elevation of a fishing weight assembly constructed in accordance with an embodiment of this invention, a fragmentary portion of a line being shown in association therewith.
Figure 7:
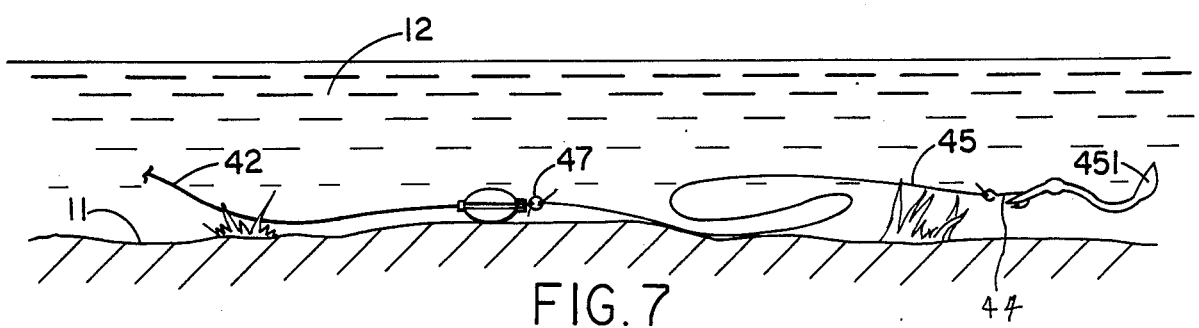
FIG. 7 is a schematic sectional view showing the fishing weight assembly resting on the bottom of a body of water with a fragmentary portion of the line, a hook, and a bait being shown in association therewith.

In FIG. 1 is shown a fishing weight assembly 10 constructed in accordance with an embodiment of this invention. In FIG. 7, the assembly is shown resting on a bottom surface 11 of a body of water 12. The weight assembly includes an elongated weight body 14 having a lengthwise central bore 16. The weight body 14 can be formed of heavy metal such as lead or the like. Ends of the bore 16 terminate in end panels 17 and 18 of the body 14. A lengthwise radial slot 20 is formed in the weight body 14 extending from the central lengthwise bore 16 through an outer wall 22 of the weight body 14.

Figure 3:
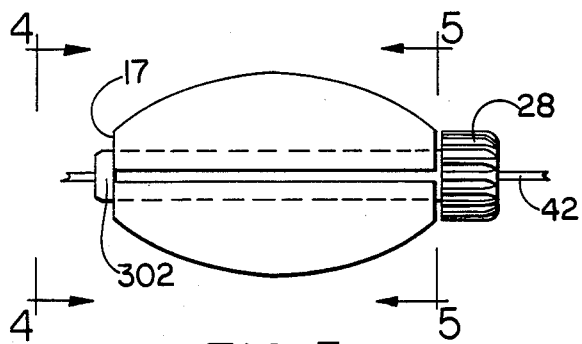
FIG. 3 is a view in side elevation of the fishing weight assembly showing a plug of the fishing weight assembly in rotated position.
Figure 4:
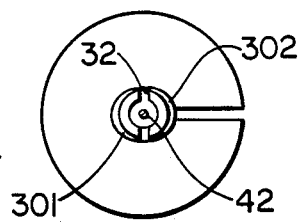
FIG. 4 is a view looking in the direction of the arrows 4—4 in FIG. 3 the line being shown in section.
Figure 5:
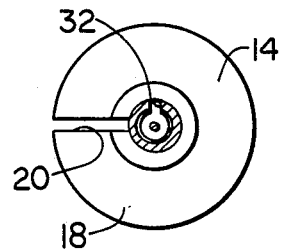
FIG. 5 is a view in section taken on the line 5—5 in FIG. 3.
Figure 6:
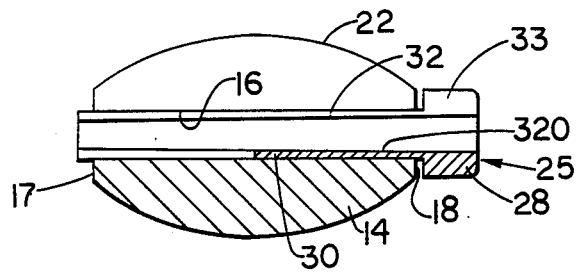
FIG. 6 is a view in section taken on the line 6—6 in FIG. 1.

A plug 25 is mounted in the bore 16. The plug 25 includes a disc-shaped head 28 and a stem 30. The stem 30 is frictionally and turnably received inside the bore 16. The plug 25 is provided with a generally radially directed slot 32. A bore 320 extends lengthwise of the stem 30 and the head 28 of the plug 25 substantially centrally of the plug 25. A portion 33 of the slot 32 extends into the head 28. The slot 32-33 is alignable with the slot 20 of the weight body 4. End portions 301 and 302 of the stem 30 can be upset to form a second head engageable with the end panel 17 to hold the plug 25 in assembled relation with the weight body 14. The portion of the stem 30 which carries the upset end portions 301 and 302 is bifurcated as shown in FIGS. 4 and 6 to render that portion of the stem 30 resilient and to permit inward movement of the upset portions 301 and 302 to permit the upset portions to pass along the bore 16. The plug 25 can be rotated to bring the slot 32-33 of the plug 25 out of alignment with the slot 20 of the weight body 14, as shown in FIGS. 3 and 5.

Figure 2:
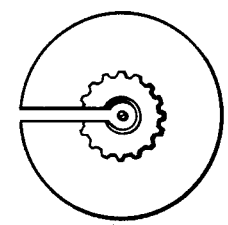
FIG. 2 is a view in end elevation of the fishing weight assembly looking in the direction of the arrows 2—2 in FIG. 1, the line being shown in section.

When the slots in the body 14 and the plug 25 are aligned, as shown in FIGS. 1 and 2, a line 42 can be inserted into the center of the weight assembly 10. The plug 25 can then be turned, as to the position shown in FIGS. 3, 4 and 5, to hold the line 42 in the lengthwise bore 16 of the body 14 and the central bore 320 of the plug 25 so that the line 42 can slide freely lengthwise of the weight assembly 10; however, the line 42 does not come free of the weight assembly 10 as long as the slot 32-33 of the plug 25 is out of alignment with the slot 20 of the weight body 14.

A hook 44 can be attached to an end portion of the line 42 by an appropriate connection or leader 45. A fitting 47 on the leader 45 is engageable with the head 28 of the plug 25 to hold the leader 45 from traveling through the central bore 16 of the weight body 14. A bait 451 can be mounted on the hook 44. When a fish strikes at the bait 451 and engages the hook 44, the fish can advance with the bait 451 and the hook 44 behaving in a natural way without interference from the weight assembly 10 until the fisherman (not shown) puts tension on the line 42.

The fishing weight assembly 10 can slide freely on the line 42 as required. However, if the plug 25 is turned to bring slot 32-33 of the plug 25 into alignment with the slot 20 of the weight body 14, the fishing weight assembly 10 can readily be removed from the line 42.

The fishing weight assembly illustrated in the drawing and described above is subject to structural modification without departing from the spirit and scope of the appended claims.

Having described my invention, what I claim as new and desire to secure by Letters Patent is:

1. A fishing weight assembly which comprises an elongated body having spaced end panels, there being an elongated bore in the body, ends of the bore being in the end panels, there being a radial slot in the body extending outwardly from the bore through an outer face of the body, a plug member, the plug member including a stem frictionally received in the bore of the body and heads for bearing on the end panels, there being an elongated bore in the plug member extending lengthwise of the stem and the heads thereof and a radial slot extending from the bore through an outer surface thereof, an end portion of the stem being bifurcated, one of the heads including two parts, each of the parts being integral with one of the bifurcations, the bifurcated end portion of the stem and the two parts of said one of the heads being compressible to permit said one of the heads to advance along the elongated bore of the body, the radial slot of the plug member being alignable with the radial slot of the body, the bores of the body and of the stem receiving a line, the line being held in the bores when the plug member is rotated from aligned position.

2. In combination with a fishing line, a fishing weight assembly which comprises an elongated body having spaced end panels, there being an elongated bore in the body, ends of the bore being in the end panels, there being a radial slot in the body extending outwardly from the bore through an outer face of the body, a plug member, the plug member including a stem frictionally received in the bore of the body and heads for bearing on the end panels, there being an elongated bore in the plug member extending lengthwise of the stem and the heads thereof and a radial slot extending from the bore through an outer surface thereof, an end portion of the stem being bifurcated, one of the heads including two parts, each of the parts being integral with one of the bifurcations, the bifurcated end portion of the stem and the two parts of said one of the heads being compressible to permit said one of the heads to advance along the elongated bore of the body, the radial slot of the plug member being alignable with the radial slot of the body, the bores of the body and of the stem receiving a portion of the line, the line being locked in the bores when the plug member is rotated from aligned position, the line being slideable lengthwise of the fishing weight assembly when locked in the bores.

* * * * *